(12) United States Patent
Lee (10) Patent No.: US 8,366,856 B2
(45) Date of Patent: Feb. 5, 2013

(54) DECORATING ACCESSORY AND METHOD OF ITS MANUFACTURE

(75) Inventor: Chi-Shih Lee, Taichung (TW)

(73) Assignee: Jah Yih Enterprise Co., Ltd., Taichung (TW)

( * ) Notice: Subject to any disclaimer, the term of this patent is extended or adjusted under 35 U.S.C. 154(b) by 106 days.

(21) Appl. No.: 13/091,199

(22) Filed: Apr. 21, 2011

(65) Prior Publication Data

US 2012/0267043 A1  Oct. 25, 2012

(51) Int. Cl.
*B32B 37/02* (2006.01)
*B32B 38/04* (2006.01)

(52) U.S. Cl. ...... 156/253; 159/269; 159/303; 159/308.2

(58) Field of Classification Search ............ 156/63, 156/250, 264, 270, 252, 253, 256, 257, 263, 156/269, 297, 302, 303, 308.2, 309.6, 324; 428/542.6; 602/56
See application file for complete search history.

(56) References Cited

U.S. PATENT DOCUMENTS

| 6,015,470 | A  | * | 1/2000 | Treleaven et al. ............. 156/267 |
| 6,765,123 | B2 | * | 7/2004 | de Jong et al. ................... 602/56 |
| 7,832,123 | B2 |   | 11/2010 | Fallon et al. ..................... 36/100 |
| 2009/0234383 | A1 | * | 9/2009 | Ierulli ...................... 606/204.45 |

* cited by examiner

*Primary Examiner* — Katarzyna Wyrozebski Lee
*Assistant Examiner* — Scott W Dodds
(74) *Attorney, Agent, or Firm* — Alan Kamrath; Kamrath IP Lawfirm, P.A.

(57) ABSTRACT

A method for manufacturing a decorating accessory includes the steps of: (a) preparing a base, a first film and a second film; (b) attaching the first film to the base; (c) cutting the first film; (d) removing a remaining portion of the first film; (e) attaching the second film to the first film; (f) cutting the second film; (g) removing a remaining portion of the second film to form a stacked array; (h) hot pressing the stacked array to get a finished decorating accessory; (i) collecting the finished decorating accessory.

12 Claims, 14 Drawing Sheets

DECORATING ACCESSORY AND METHOD OF ITS MANUFACTURE

BACKGROUND OF THE INVENTION

1. Field of the Invention

The present invention relates generally to a decorating accessory and, more particularly, to a decorating accessory for decorating materials such like shoes or bags.

2. Description of the Related Art

U.S. Pat. No. 7,832,123 shows a set of shoes for use by members of a team. The shoes allow for a uniform appearance in a team environment by way of substantially similar uppers, while providing individualized performance specifications, with respect to support and breathability, for each upper. The substantially similar appearance of the upper may be due to material overlays, stitch patterns, color scheme and/or perforations and may be based on team criteria. The uppers are materially different from each other due to internal or external supports, material types and/or breathability.

Presently, the construction of a shoe upper requires a substantial amount of manual labor. While the production of a sole of a modern sport shoe can be automated to a great extent, the stitching of the different materials of the upper still requires a significant amount of manual labor.

The present invention is, therefore, intended to obviate or at least alleviate the problems encountered in the prior art.

SUMMARY OF THE INVENTION

According to the present invention, the main purpose is to provide a method for manufacturing a decorating accessory which includes the steps of: (a) preparing a base, a first film and a second film; (b) attaching the first film to the base; (c) cutting the first film; (d) removing a remaining portion of the first film; (e) attaching the second film to the first film; (f) cutting the second film; (g) removing a remaining portion of the second film to form a stacked array; (h) hot pressing the stacked array to get a finished decorating accessory; (i) collecting the finished decorating accessory.

An advantage of the method for producing the decorating accessory according to the present invention is that the first and second films are connected with each other by hot pressing rather than stitching, thereby allowing the decorating accessory to be processed accurately, conveniently and in a cost-saving manner.

Other advantages and features of the present invention will become apparent from the following description referring to the drawings.

BRIEF DESCRIPTION OF THE DRAWINGS

The present invention will be described through detailed illustration of the preferred embodiments referring to the drawings.

DETAILED DESCRIPTION OF THE PREFERRED EMBODIMENT

The present invention will be described through detailed illustration of three embodiments referring to the drawings.

Figure 1:
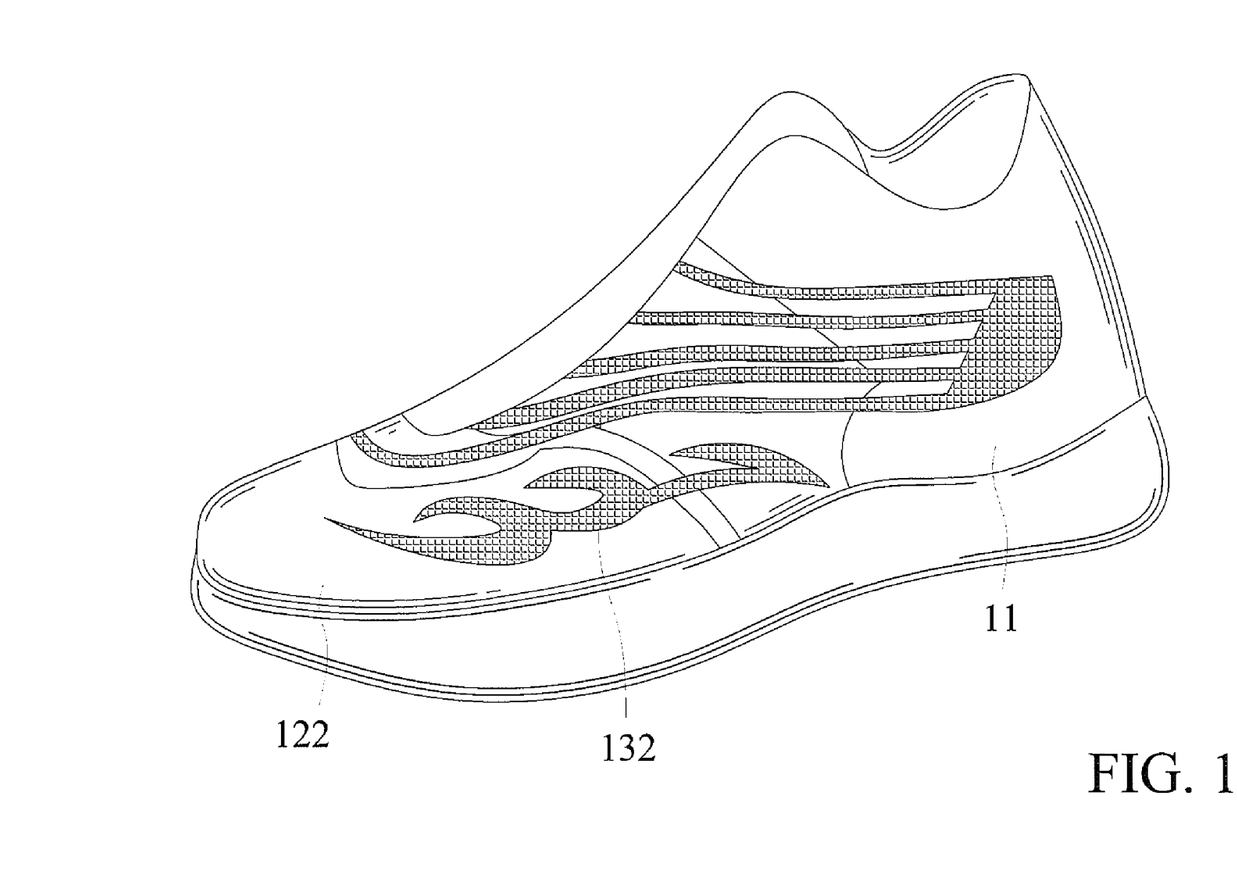
FIG. 1 shows a shoe with a decorating accessory according to the present invention.
Figure 2:
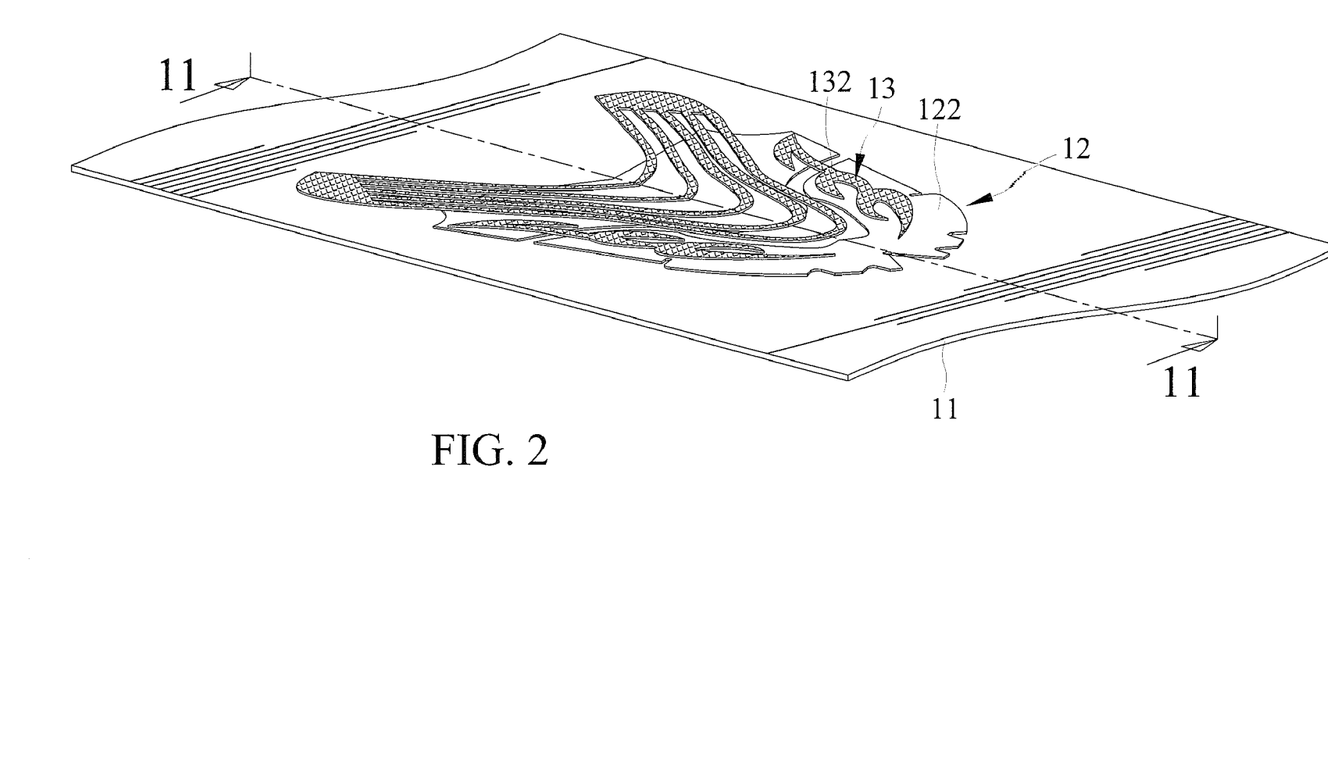
FIG. 2 is a perspective view of the decorating accessory according to a first embodiment of the present invention.
Figure 3:
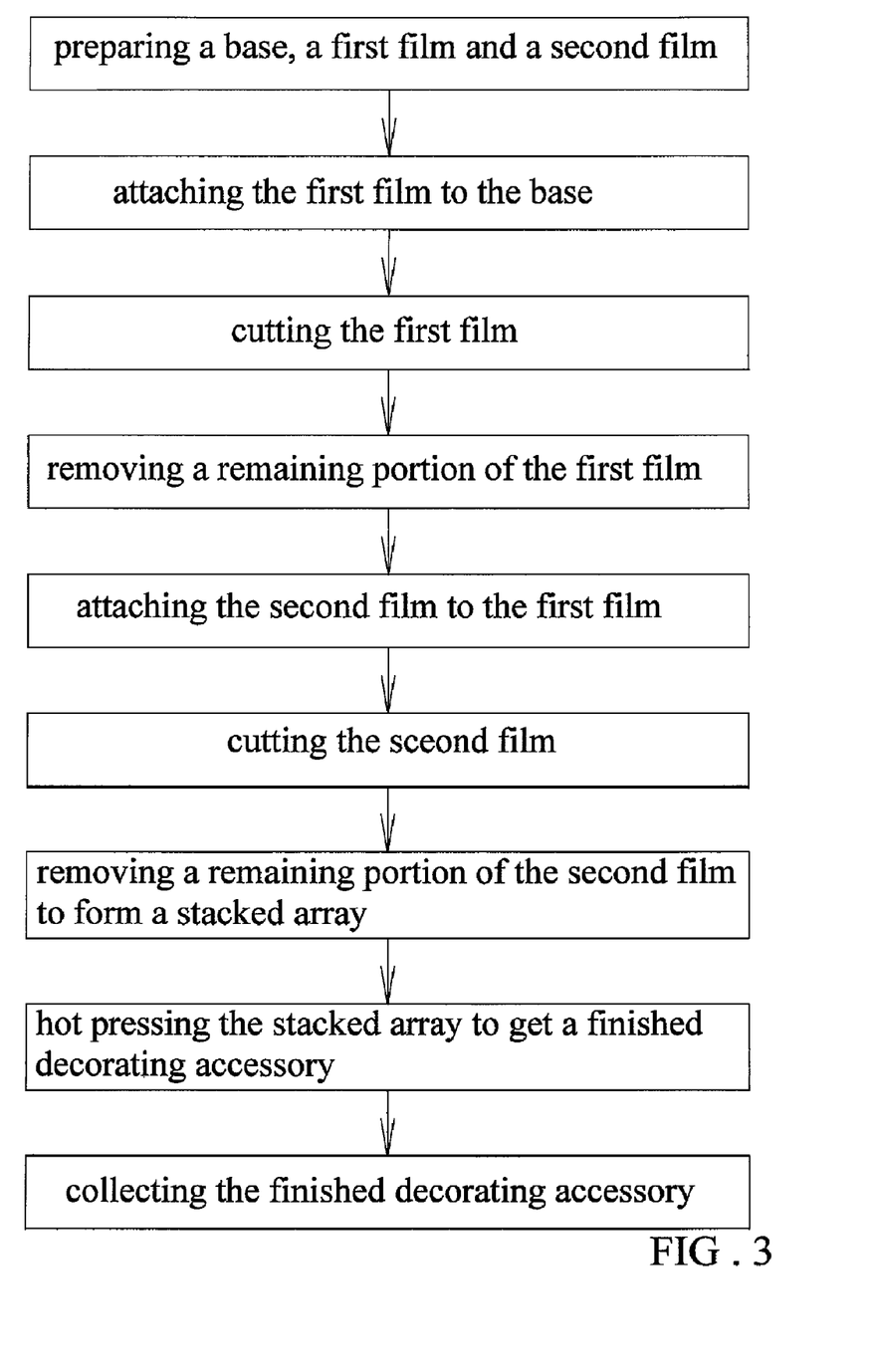
FIG. 3 is a flow chart of a method for producing a decorating accessory in accordance with the present invention.

Referring to FIGS. 1 to 2, there is shown a decorating accessory according to a first embodiment of the present invention. The decorating accessory is adapted for coupling with an upper of a shoe (as shown in FIG. 1) or with an outer surface of a bag (not shown). The decorating accessory comprises a base layer 11, a first film 12 and a second film 13 both connected to the base 12.

Referring to FIGS. 3 through 11, there is a method for manufacturing the decorating accessory according to a first embodiment of the present invention which includes the steps of: (a) preparing a base, a first film and a second film; (b) attaching the first film to the base; (c) cutting the first film; (d) removing a remaining portion of the first film; (e) attaching the second film to the first film; (f) cutting the second film; (g) removing a remaining portion of the second film to form a stacked array; (h) hot pressing the stacked array to get a finished decorating accessory; (i) collecting the finished decorating accessory.

Figure 4:
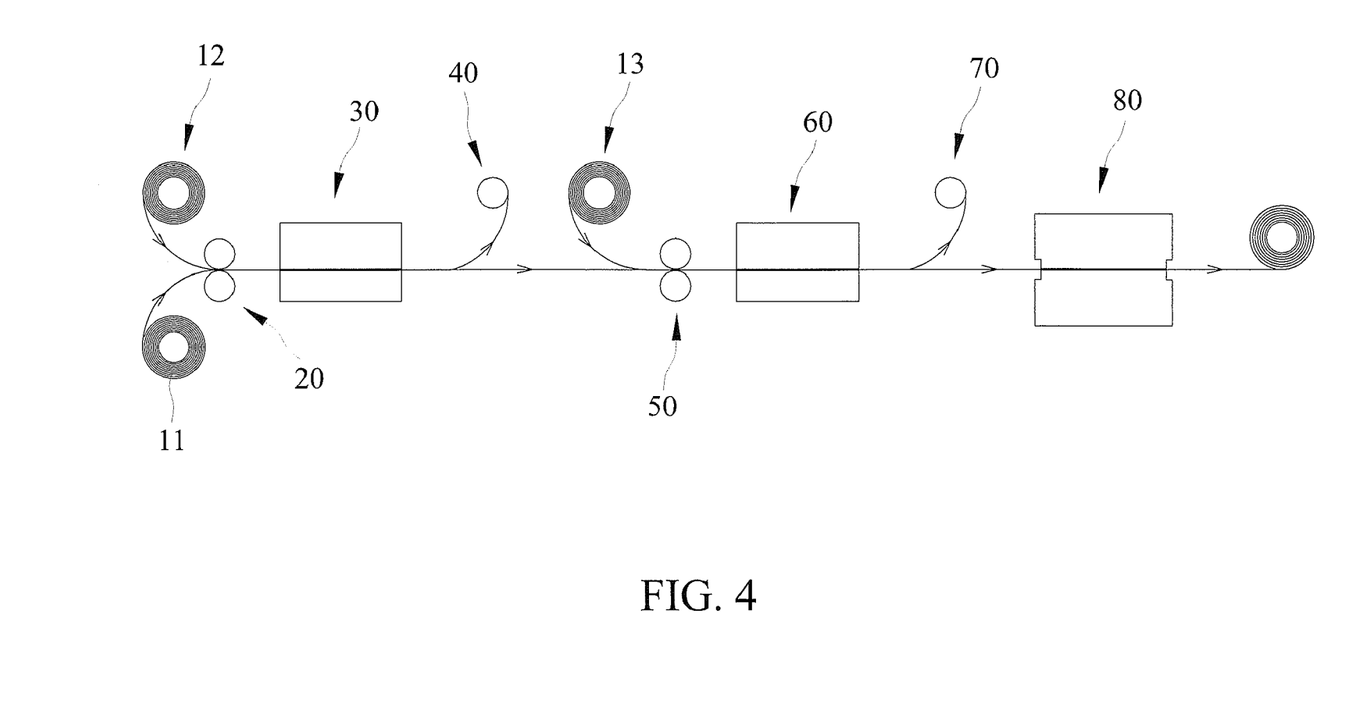
FIG. 4 is a process view showing a method for manufacturing the decorating accessory in accordance with a first embodiment of the present invention.

At step (a), the base 11 may constructed of cloth or leather. Each of the first 12 and the second 13 films may be constructed of thermoplastic polyurethane (TPU) or polyurethane (PU). The first film 12 includes a proximal side, a distal side opposite from the proximal side and a hot melt glue layer 14 provided on the proximal side thereof. The second film 13 includes a proximal side, a distal side opposite from the proximal side and a hot melt glue layer 15 provided on the proximal side thereof.

Figure 5:
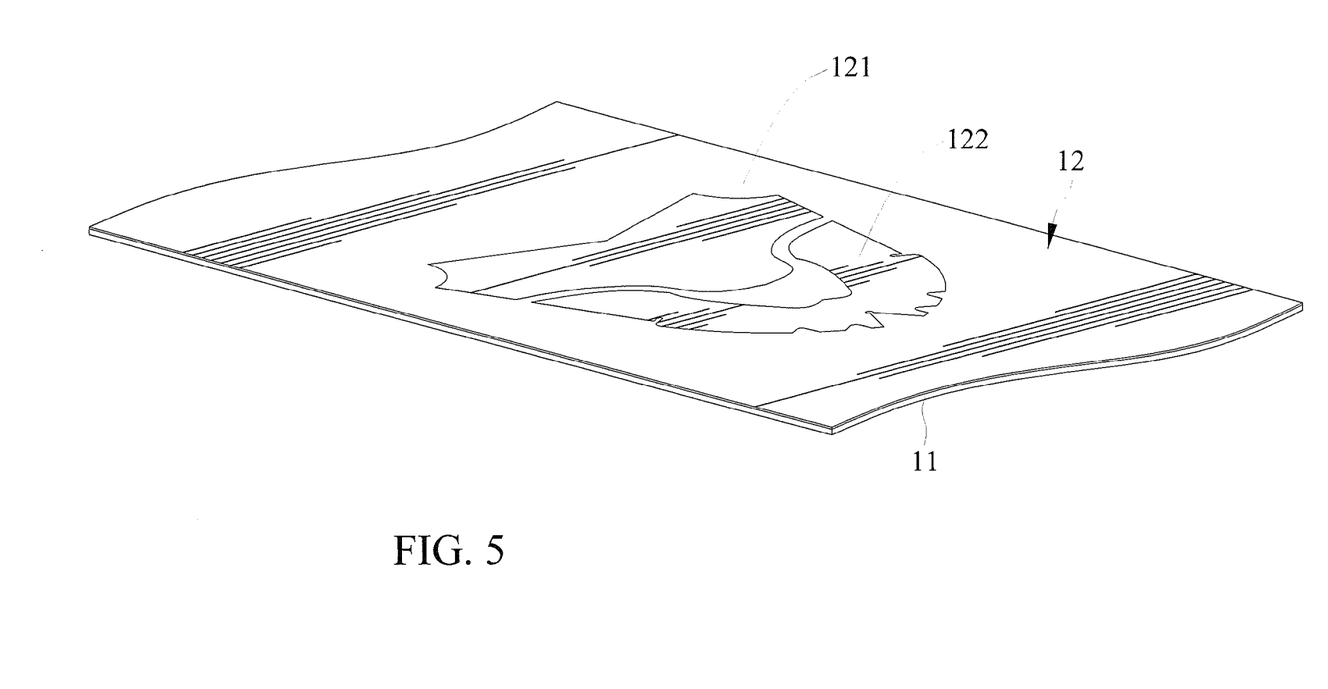
FIG. 5 illustrates a first film is attached to a base and is cut via a first cutting tool.

At step (b), the first film 12 is stacked onto a surface of the base 11. Preferably, the hot melt glue layer 14 of the first film 12 is connected to the surface of the base 11. The first film 12 and the base 11 are attached with each other via a first roller 20.

At step (c), while the base 10 and the first film 12 pass through a first cutting tool 30, the first film 12 is cut via the first cutting tool 30 such that the first film 12 includes a decorating portion 122 and a remaining portion 121 separated by the first cutting tool 30 which includes a cutting blade (not shown) having a profile corresponding to required shape of the decorating portion 122 of the first film 12. Preferably, a cutting depth of the first cutting tool 30 is adjustable.

Figure 6:
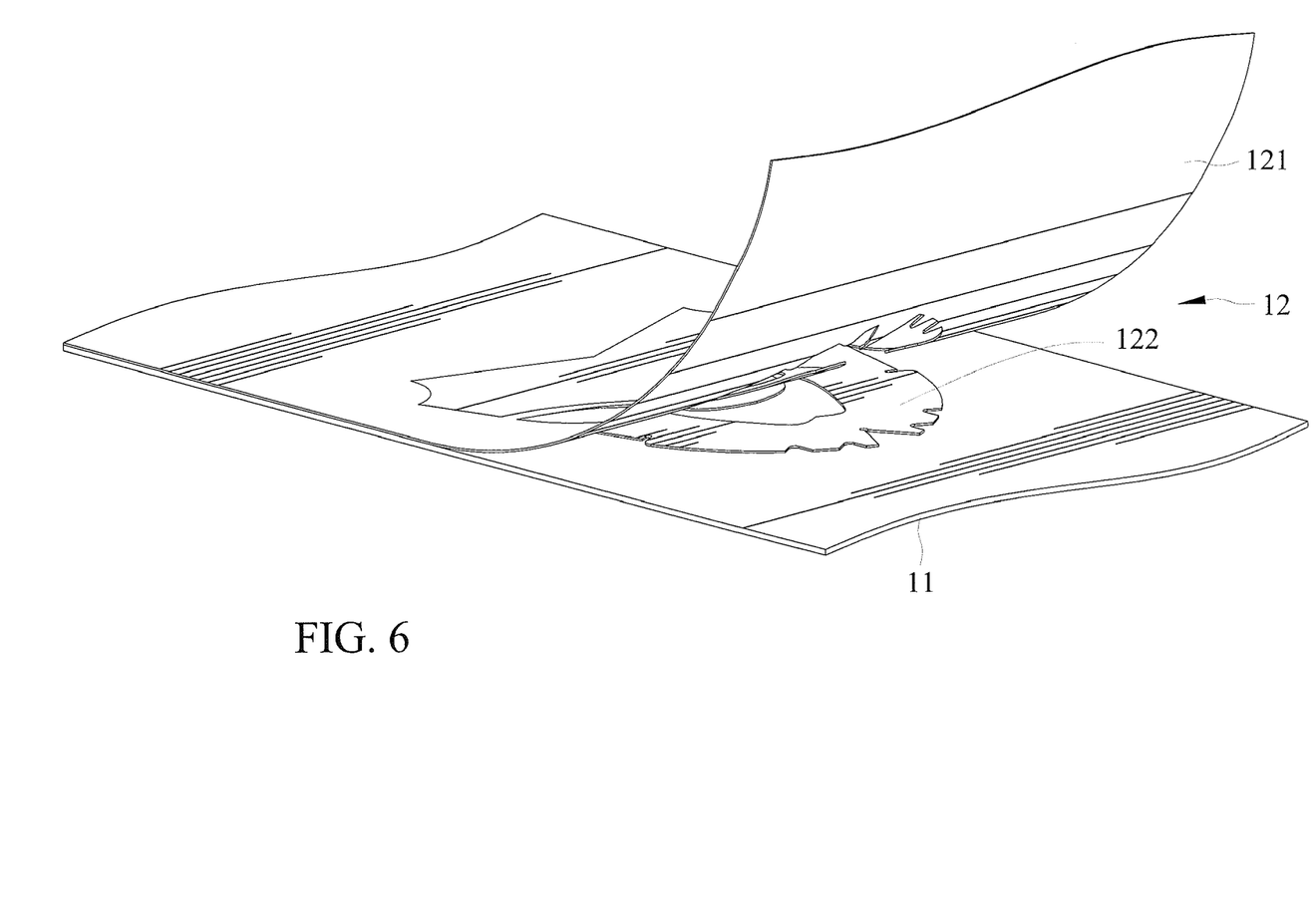
FIG. 6 illustrates a remaining portion of the first film is removed from the base.
Figure 7:
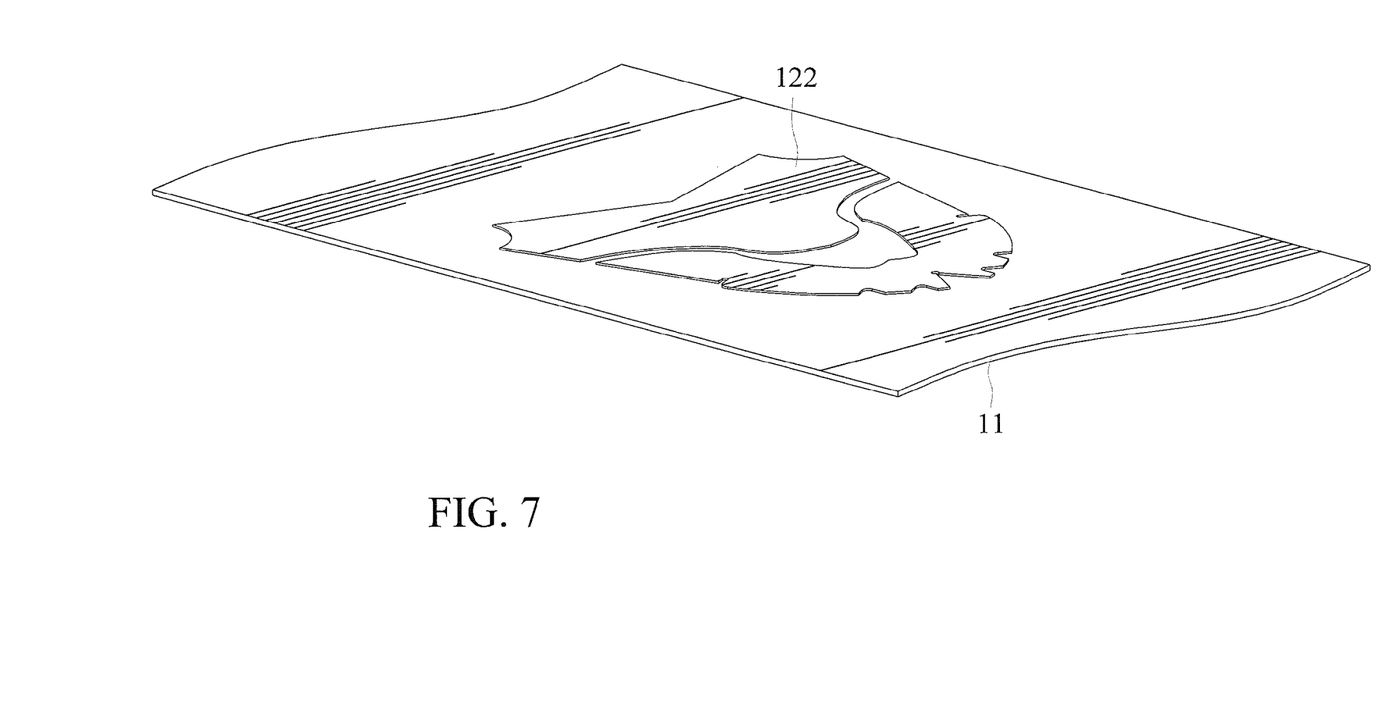
FIG. 7 illustrates a decorating portion of the first film is connected to the base.

At step (d), after the first film 12 has been cut, the remaining portion 121 of the first film 11 is removed by being wound onto a first collector 40, and the decorating portion 122 of the first film 12 is connected to the base 11.

Figure 8:
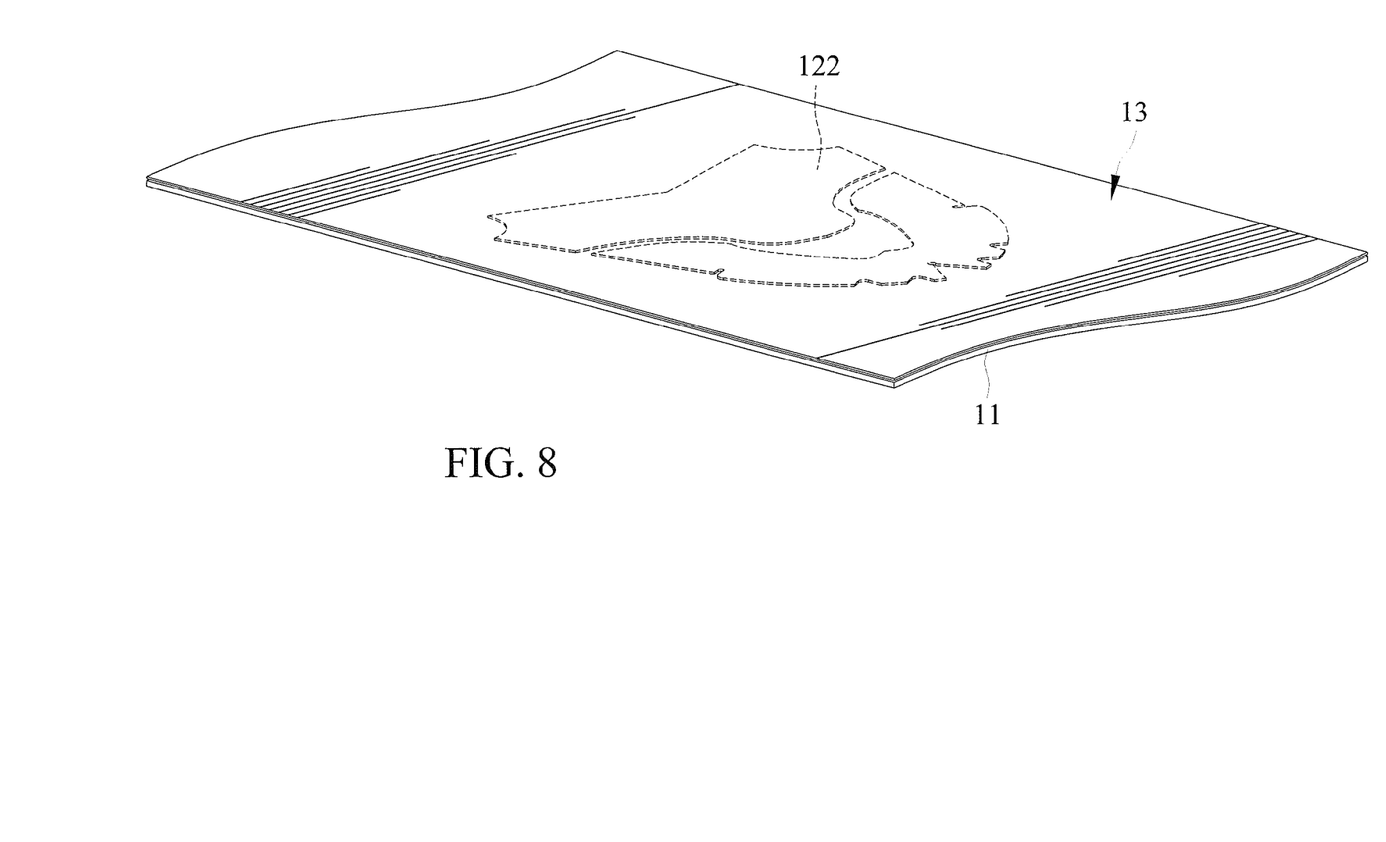
FIG. 8 illustrates a second film is attached to the first film.

At step (e), the second film 13 is stacked onto a distal side of the first film 11. Preferably, the hot melt glue layer 15 of the second film 13 is connected to the distal side of the first film 12. The second film 13 and the first film 12 are attached with each other via a second roller 50.

Figure 9:
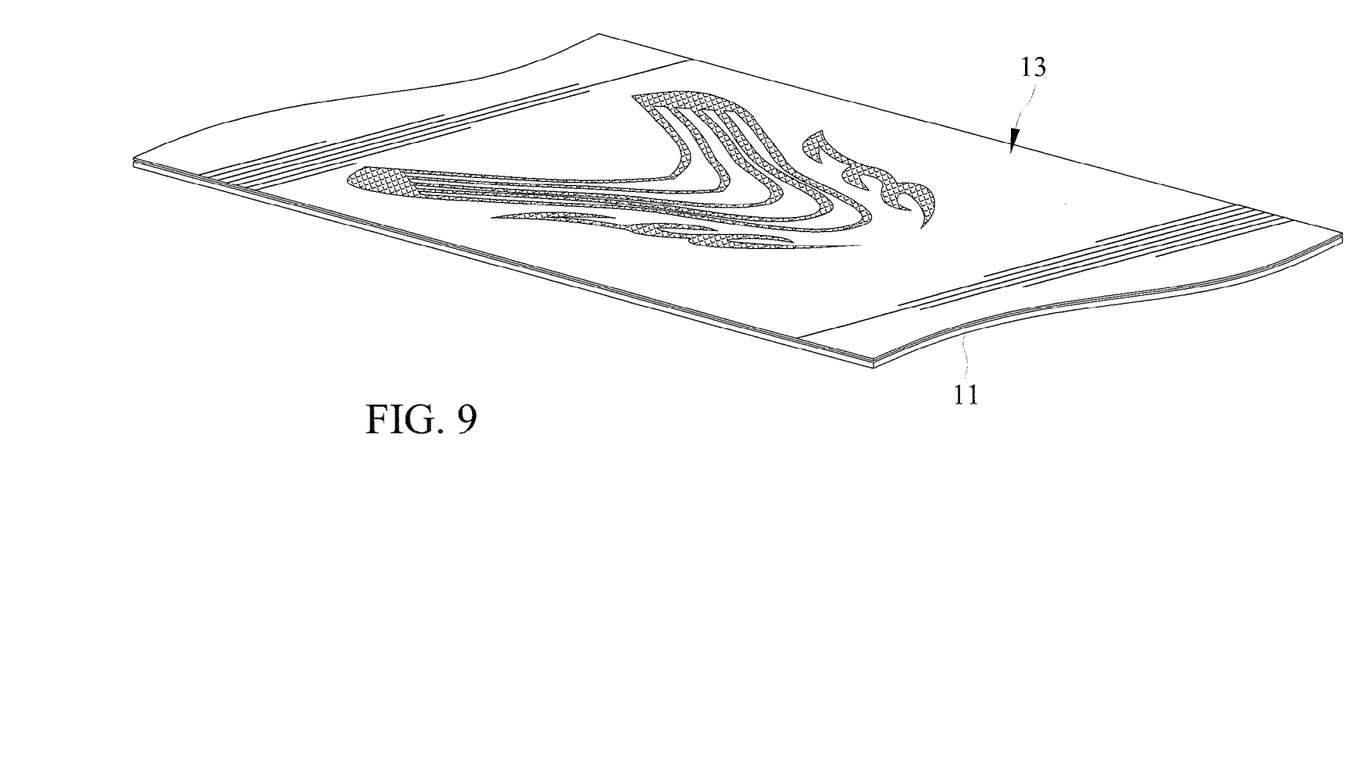
FIG. 9 illustrates the second film is cut via a second cutting tool.

At step (f), while the base 11, the first film 12 and the second film 13 pass through a second cutting tool 60, the second film 13 is cut via the second cutting tool 60 such that the second film 13 includes a decorating portion 132 and a remaining portion 131 separated by the second cutting tool 60 which includes a cutting blade (not shown) having a profile corresponding to required shape of the decorating portion 132 of the second film 13. Preferably, a cutting depth of the second cutting tool 60 is adjustable.

Figure 10:
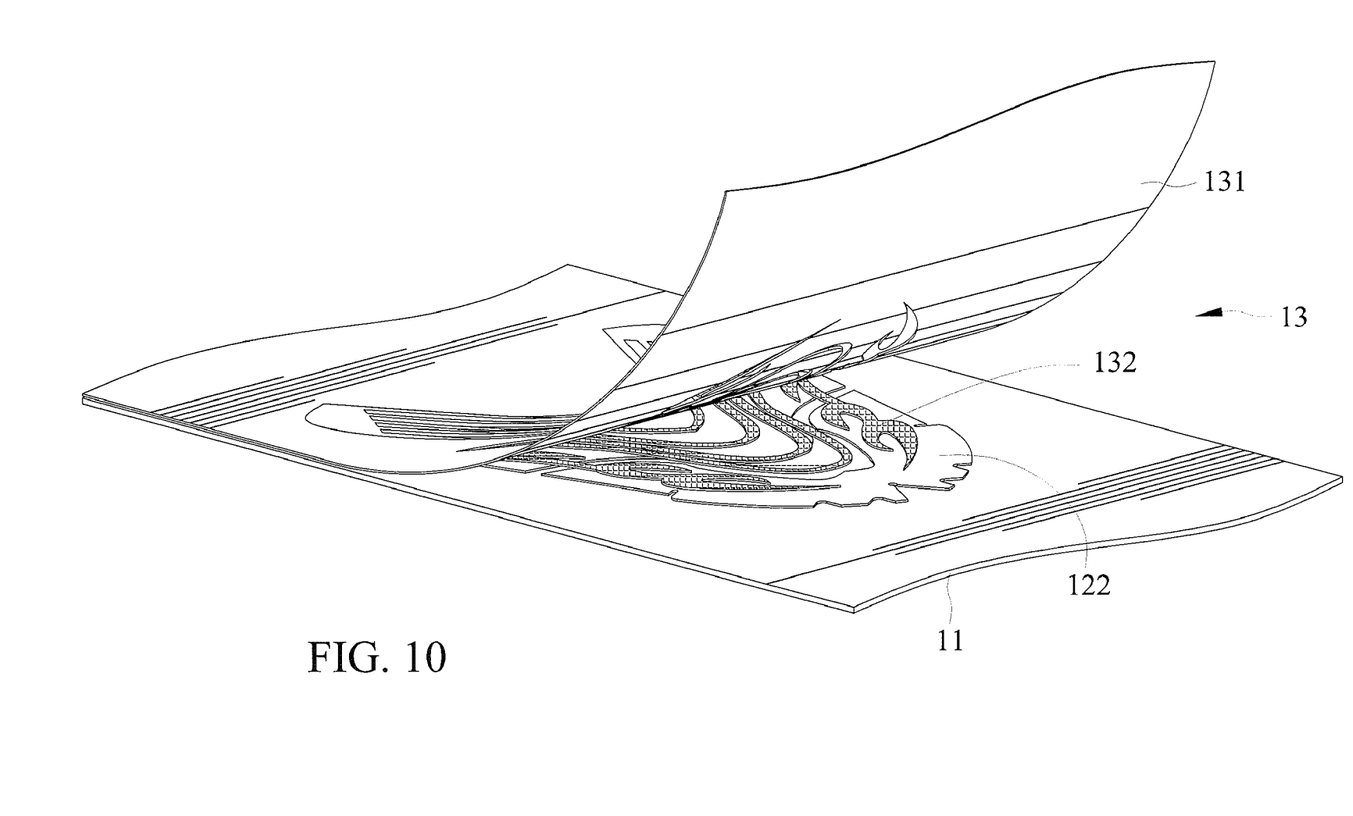
FIG. 10 illustrates a remaining portion of the second film is removed from the first film.

At step (g), after the second film 13 has been cut, the remaining portion 131 of the second film 13 is removed by being wound onto a second collector 70, and the decorating portion 132 of the second film 13 is connected to the first film 12. The base 11, the decorating portions 121 and 131 of the first 12 and the second 13 films are defined as a stacked array (not labeled).

At step (h), the stacked array is disposed in a hot press apparatus 80, in which the hot press apparatus 80 is of preferred temperature, time and pressure. Preferably, each temperature, time and pressure of the hot press apparatus 80 is adjustable. The stacked array is heated and is pressed by the hot press apparatus 80 to get a finished decorating accessory. Preferably, the hot press apparatus 80 is of a plate type. The stacked array is heated and is pressed by a plate (not labeled) of the hot press apparatus 80 such that the base 11, the decorating portion 122 of the first film 12, and the decorating portion 132 of the second film 13 would be tightly connected with each other via the hot press apparatus 80.

At step (i), the finished decorating accessory is wound up to a decorating accessory wind-up roll (not labeled) for facilitating transportation and storing thereof.

Figure 11:
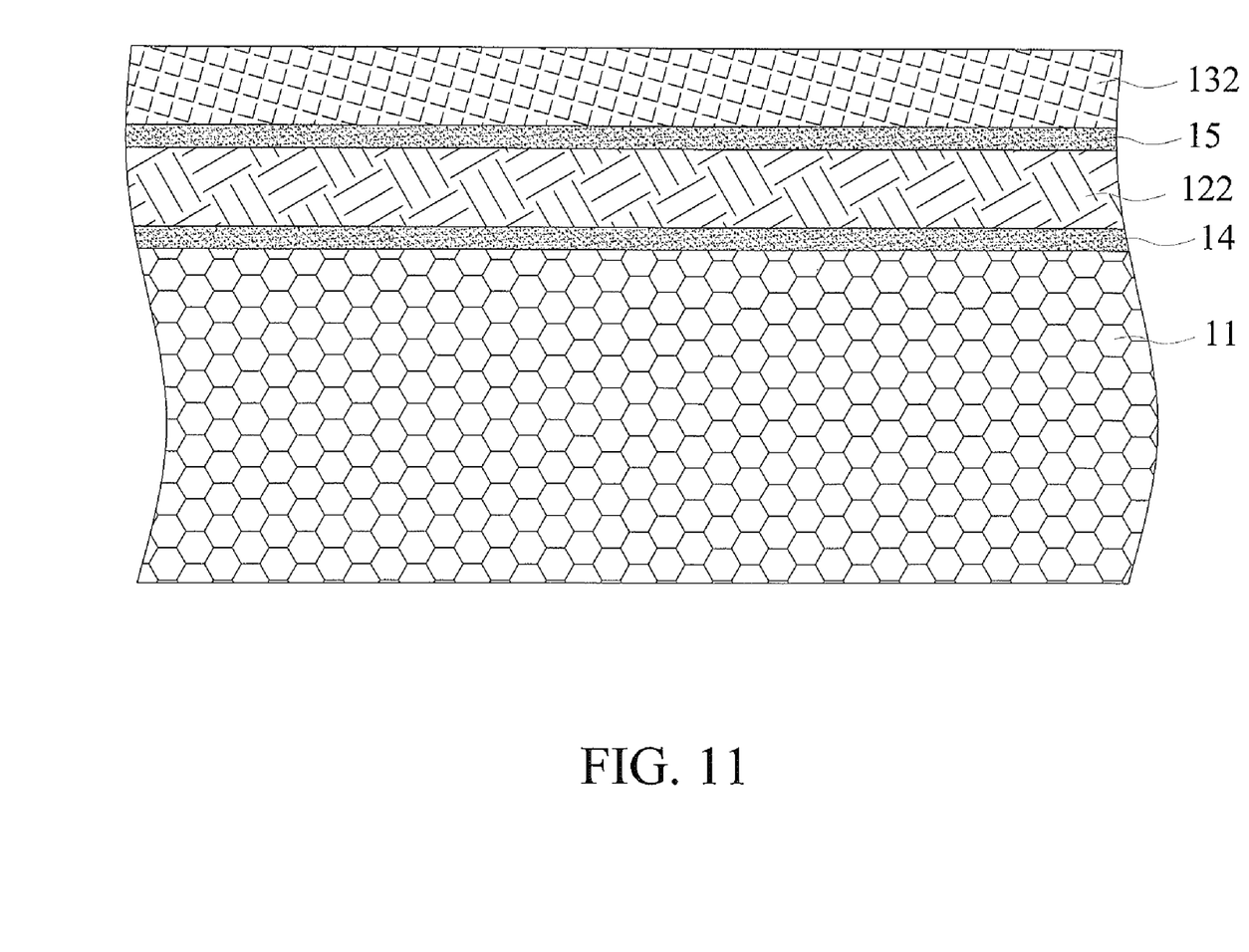
FIG. 11 is a cross-sectional view taken from line 11-11 of FIG. 2.

Preferably, a periphery of the decorating portion 132 of the second film 13 extends outside a periphery of the decorating portion 122 of the first film 12, hence, the decorating portion 132 of the second film 13 has a first section directly disposed to the decorating portion 122 of the first film 12 and a second section directly disposed to the base 11. The base 10, the first 12 and second 13 films are connected with each other by hot pressing rather than stitching, thereby allowing the decorating accessory to be processed accurately, conveniently and in a cost-saving manner.

Figure 12:
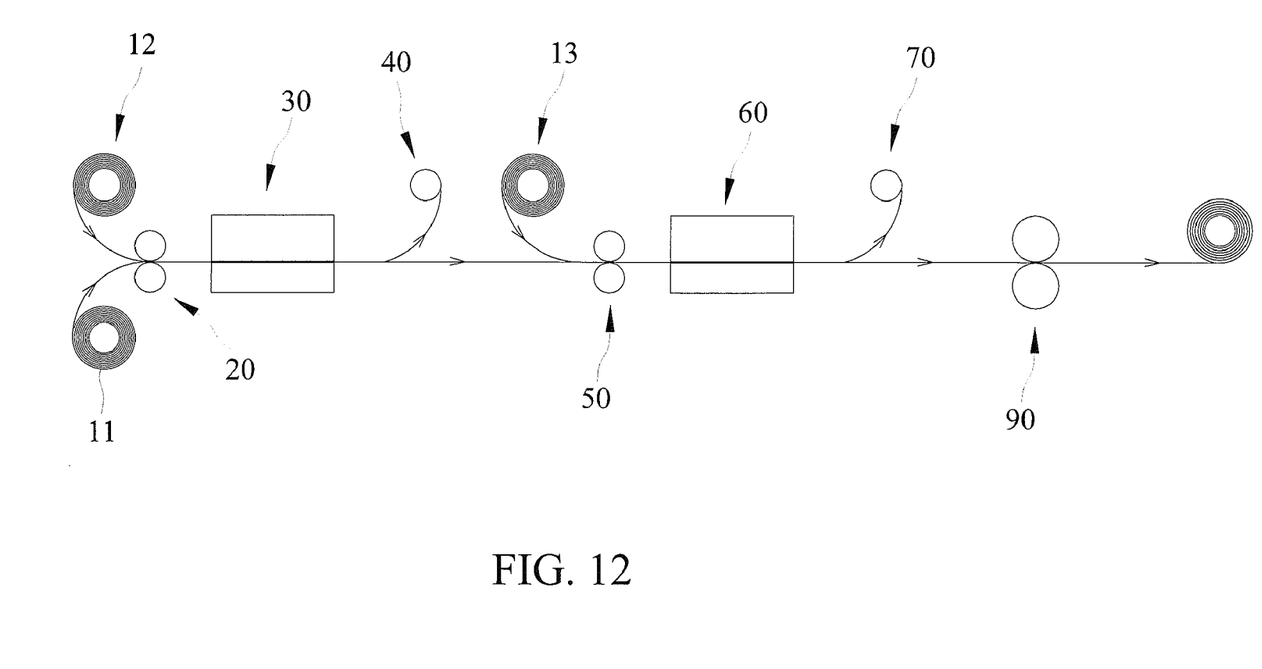
FIG. 12 is a process view showing a method for manufacturing the decorating accessory in accordance with a second embodiment of the present invention.

Referring to FIG. 12, shows a method for manufacturing the decorating accessory according to a second embodiment of the present invention. The second embodiment is like the first embodiment except that the hot press apparatus 90 is of a roller type. The stacked array is heated and is pressed by a roller (not labeled) of the hot press apparatus 90 such that the base 11, the decorating portion 122 of the first film 12, and the decorating portion 132 of the second film 13 would be tightly connected with each other via the hot press apparatus 90.

Figure 13:
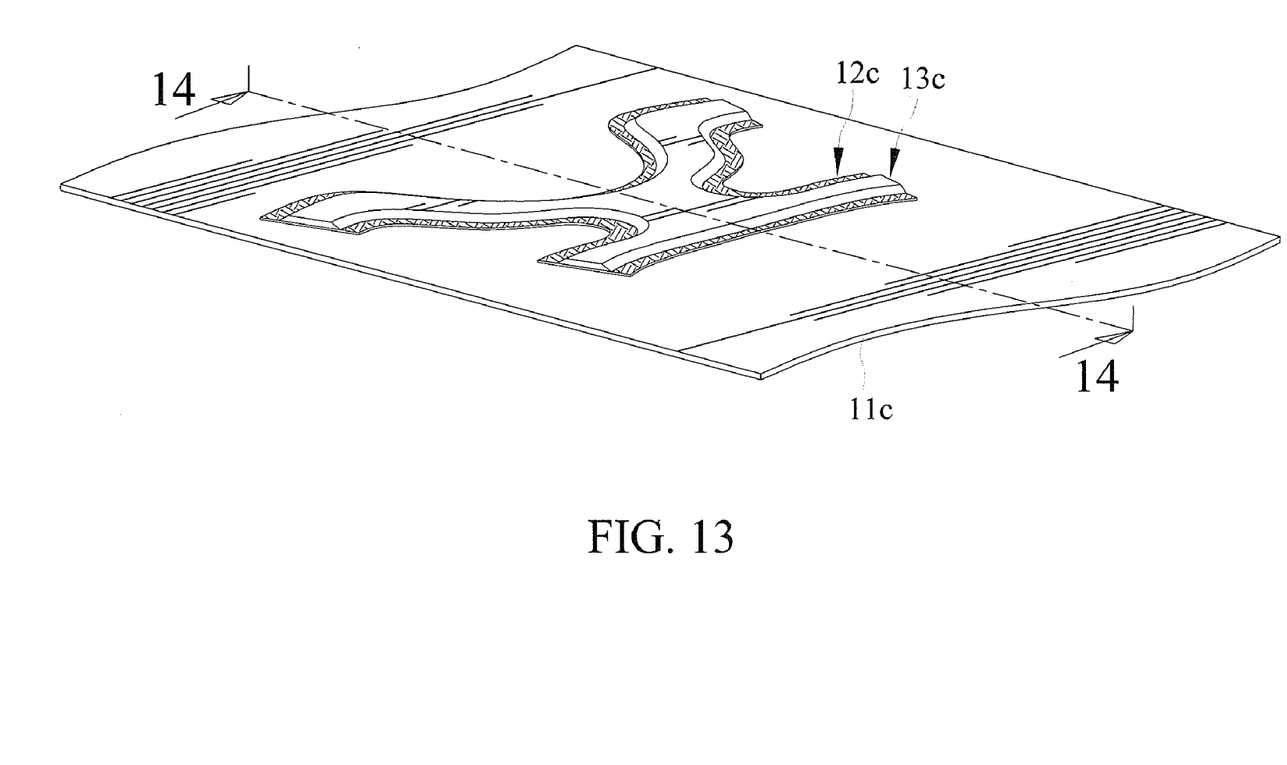
FIG. 13 a perspective view of the decorating accessory according to a third embodiment of the present invention.
Figure 14:
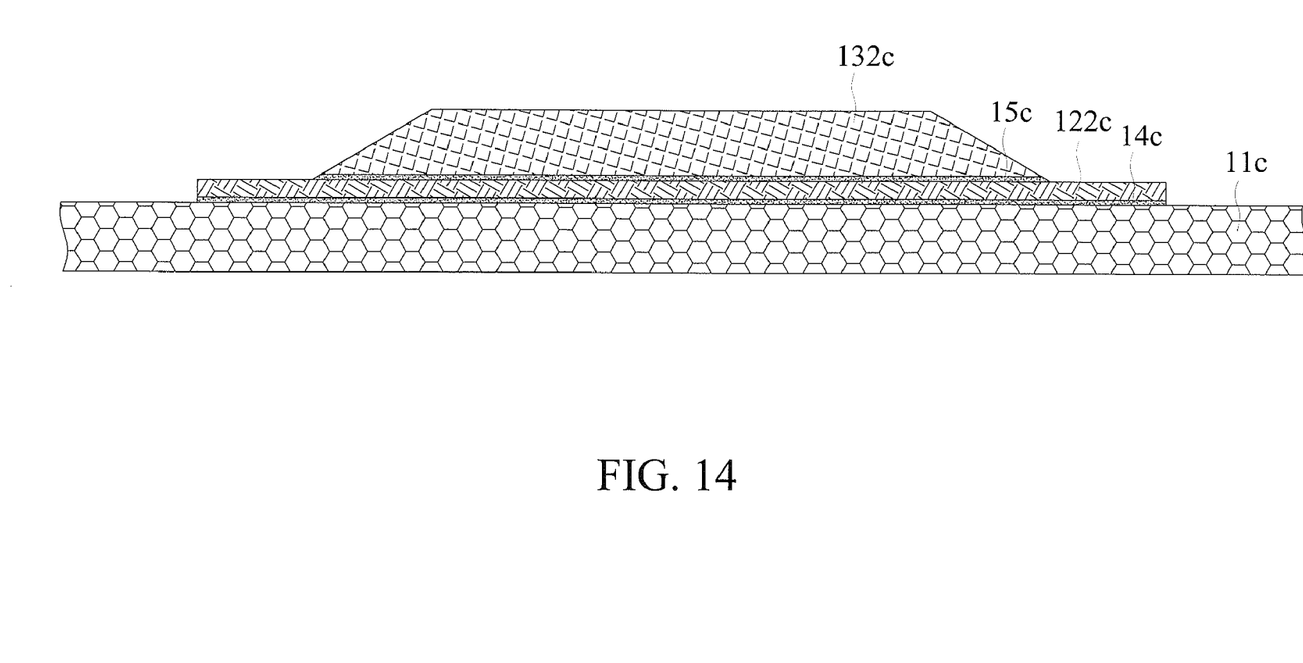
FIG. 14 is cross-sectional view taken from line 14-14 of FIG. 13.

FIGS. 13 and 14 show a decorating accessory in accordance with a third embodiment of the present invention. Parts of the decorating accessory of the third embodiment correspond to parts of the decorating accessory of the first embodiment have the same reference numerals with the suffix "c". The second embodiment is like the first embodiment except that contours of the decorating portions 122c and 132c of the first 12c and the second 13c films of the third embodiment are different from that of the first embodiment. Preferably, the decorating portion 132c of the second film 13c has a thickness larger than that of the decorating portion 122c of the first film 12c so that a surface of the multi-layer decorating element is ridges and hills irregularly. Additionally, a periphery of the decorating portion 132c of the second film 13c is completely within a periphery of the decorating portion 122c of the first film 12c, hence, the decorating portion 132c of the second film 13c is directly disposed to the decorating portion 122c of the first film 12c.

The present invention has been described through the illustration of the embodiments. Those skilled in the art can derive variations from the embodiments without departing from the scope of the present invention. Hence, the embodiments shall not limit the scope of the present invention defined in the claims.

What is claimed is:

1. A method for manufacturing a decorating accessory includes the steps of:
   (a) preparing a base, a first film and a second film;
   (b) attaching the first film to the base, wherein the first film is stacked onto a surface of the base, with the first film and the base attached with each other via a first roller;
   (c) cutting the first film, wherein while the base and the first film pass through a first cutting tool, the first film is cut via the first cutting tool;
   (d) removing a remaining portion of the first film, wherein a remaining portion of the first film is removed by being wound onto a first collector, and a decorating portion of the first film is connected to the base;
   (e) attaching the second film to the first film, wherein the second film is stacked onto a distal side of the first film, with the second film and the first film attached with each other via a second roller;
   (f) cutting the second film, wherein while the base, the first film and the second film pass through a second cutting tool, the second film is cut via the second cutting tool;
   (g) removing a remaining portion of the second film to form a stacked array, wherein a remaining portion of the second film is removed by being wound onto a second collector, and a decorating portion of the second film is connected to the first film, with the base, the decorating portions of the first and the second films are defined as the stacked array; and
   (h) hot pressing the stacked array to get a finished decorating accessory.

2. The method for manufacturing a decorating accessory as claimed in claim 1 further includes the step of:
   (i) collecting the finished decorating accessory, wherein the finished decorating accessory is wound up to a decorating accessory wind-up roll.

3. The method for manufacturing a decorating accessory as claimed in claim 1, wherein the first film includes a hot melt glue layer provided on one side thereof, wherein the second film includes a hot melt glue layer provided on one side thereof.

4. The method for manufacturing a decorating accessory as claimed in claim 1, wherein the first cutting tool includes a cutting blade having a profile corresponding to required shape of the decorating portion of the first film, wherein the second cutting tool includes a cutting blade having a profile corresponding to required shape of the decorating portion of the second film.

5. The method for manufacturing a decorating accessory as claimed in claim 4, wherein a cutting depth of the first cutting tool is adjustable, wherein a cutting depth of the second cutting tool is adjustable.

6. The method for manufacturing a decorating accessory as claimed in claim 1, each of temperature, time and pressure of the hot press apparatus is adjustable.

7. The method for manufacturing a decorating accessory as claimed in claim 1, wherein the first film is constructed of thermoplastic polyurethane and the second film is constructed of thermoplastic polyurethane.

8. The method for manufacturing a decorating accessory as claimed in claim 1, wherein the first film is constructed of thermoplastic polyurethane and the second film is constructed of polyurethane.

9. The method for manufacturing a decorating accessory as claimed in claim 1, wherein the first film is constructed of polyurethane and the second film is constructed of thermoplastic polyurethane.

10. The method for manufacturing a decorating accessory as claimed in claim 1, wherein the first film is constructed of polyurethane and the second film is constructed of polyurethane.

11. The method for manufacturing a decorating accessory as claimed in claim 1, wherein the hot press apparatus is of a plate type.

12. The method for manufacturing a decorating accessory as claimed in claim 1, wherein the hot press apparatus is of a roller type.

* * * * *